(12) United States Patent
Davis

(10) Patent No.: US 6,471,158 B1
(45) Date of Patent: Oct. 29, 2002

(54) VERTICAL TAKE-OFF AND LANDING VEHICLE CONFIGURED AS A COMPOUND AUTOGYRO

(76) Inventor: Robert P. Davis, 220 Blackstone Blvd., Providence, RI (US) 02906

( * ) Notice: Subject to any disclaimer, the term of this patent is extended or adjusted under 35 U.S.C. 154(b) by 0 days.

(21) Appl. No.: 09/352,637

(22) Filed: Jul. 15, 1999

(51) Int. Cl.[7] .............................................. B64C 27/22
(52) U.S. Cl. ............................................................ 244/8
(58) Field of Search ............................ 244/17.11, 23 R, 244/8, 6, 7 R, 7 A

(56) References Cited

U.S. PATENT DOCUMENTS

| | | | | |
|---|---|---|---|---|
| RE21,478 E | * | 6/1940 | Smith | 244/6 |
| 2,941,749 A | * | 6/1960 | Sullivan et al. | 244/6 |
| 3,375,997 A | * | 4/1968 | Gist, Jr. | 244/17.11 |
| 3,794,273 A | * | 2/1974 | Girard | 244/7 A |
| 4,044,971 A | * | 8/1977 | Pharris | 244/7 R |
| 4,589,611 A | * | 5/1986 | Ramme et al. | 244/6 |
| 4,730,795 A | * | 3/1988 | David | 244/6 |
| 4,928,907 A | * | 5/1990 | Zuck | 244/6 |
| 5,454,530 A | * | 10/1995 | Rutherford et al. | 244/7 A |
| 5,727,754 A | * | 3/1998 | Carter, Jr. | 244/8 |
| 5,984,635 A | * | 11/1999 | Keller | 416/20 A |

* cited by examiner

*Primary Examiner*—Peter M. Poon
*Assistant Examiner*—Kevin Jakel
(74) *Attorney, Agent, or Firm*—Salzman & Levy

(57) ABSTRACT

A compound autogyro has a unique system of rotor blade retraction and vectored thrust. Redundant thrust systems provide for emergency conditions. Located in the upper mast are twin gas lines leading to a hub section of the rotor. In the hub, they divide the mass flow into two additional gas lines reaching to the tip ends of rigid rotor blades. A revolving, upper section of the rotor mast is attached to a lower, non-rotating section by a spherical bearing. Directly beneath this attach bearing is a distribution plenum, which receives the mass flow from each of three or four turbofan engines. To achieve high levels of propulsion, the turbofans are equipped with vectoring vanes that direct the mass flow to a plenum or, in the alternative, out a jet pipe for conventional flight. Another set of vectoring vanes can direct the mass flow downwardly, in case of a serious failure upon takeoff.

36 Claims, 7 Drawing Sheets

VERTICAL TAKE-OFF AND LANDING VEHICLE CONFIGURED AS A COMPOUND AUTOGYRO

FIELD OF THE INVENTION

The present invention relates to vertical take-off and landing aircraft and, more particularly, to an improved vertical take-off and landing aircraft featuring a turbofan powered, compound autogyro with retractable rotor blades and vectored thrust.

BACKGROUND OF THE INVENTION

World runway congestion is an acute and growing problem evoking costly delays for both air carriers and passengers. This serious situation is forecast to go critical in the early years of the next century. By the year 2016, for instance, all forecasts indicate that global enplanements will triple over 1990 levels but runways will not keep pace.

While there will be some new runways and airports built in the future, plus an improved management of air space, major markets such as New York, Chicago, Frankfurt and London will not experience a sufficient enhancement of runway capacity. Aircraft noise and other environmental concerns form the chief restrictions to airport development. But pervasive land use and high costs are also factors.

Clearly, there is an urgent need for a large, safe, vertical take-off and landing vehicle (VTOL) operating off Vertipads at major airports. These VTOL operations, mostly on short haul service, would help free up runways for conventional jets.

The unique design of the VTOL aircraft of this invention addresses the congestion problem, and is useful as a vehicle for humanitarian and disaster relief. It can also find applicability in timbering, fire fighting, defense employment and delivering social services to remote regions of the Third World.

The new aircraft of this invention is believed to be capable of changing many aspects of the aviation industry. While the design incorporates most of the attributes of a helicopter, the aircraft operates on the autogyro principle. Independent lift and propulsion systems are incorporated in the aircraft in a manner known in the trade as a compound autogyro, sometimes referred to as a converti-plane.

Designers, since 1946, have attempted to combine the best qualities of the airplane and the helicopter, while avoiding the limitations that each aircraft presents. The "ROTODYNE" was a compound autogyro invented in England, and was successfully demonstrated on test routes in Europe. It proved that it was indeed possible to design a safe VTOL airliner capable of lifting 70 passengers.

Alongside this development, the tilt rotor VTOL became popular in the United States. The tilt rotor, however, was not the answer for civil operations, owing to the fact that it was sized improperly. It was also troubled by a series of fatal accidents. The tilt rotor VTOL was limited to about 40 passengers, far too limited to achieve a profitable seat mile rate. Additionally, the tilt rotor was propulsion restricted to the available turboprop engines, or a cruise speed of about 340 mph, too slow to meet the 21st Century air carrier demands, even on short stage length routes.

Common misconceptions with respect to vertical lift aircraft have been widely held in the industry. Despite the existence of the ROTODYNE aircraft, the air carrier industry seems to doubt that a safe, fast, comfortable, 145-seat VTOL commercial airliner can be designed. Many mistakenly believe that such aircraft cannot be designed with backups such as two and three hydraulic systems, redundant pumping, two electrical systems, etc., which are common on conventional jet transports. Another misconception with respect to VTOL aircraft has been that turbofans could not be employed, or were somehow incompatible with rotary-winged aircraft.

A workable VTOL of this invention uses proven and demonstrated technology, and is commercially practical.

The inventive VTOL has an operating envelope between hover, or zero mph, and 520 mph. It can also stop in mid air, and back up by reversing the flow of the turbofan's exhaust.

The VTOL airliner of this invention is an assembly of proven systems designed to provide a comfort zone for air carriers and passengers alike.

The VTOL airliner of the invention operates as a conventional airliner, employing its blade system only when entering terminal air space on take-offs or landings.

The VTOL of this invention, above all else, is safe. The inventive VTOL airliner is designed with fail-safe and redundant systems, such as those featured on conventional commercial aircraft.

In the preferred embodiment of this invention, the VTOL aircraft features two independent power systems. One set of augmented turbofans, proven military engines, are employed to power the rotor blades via a reactive drive system known in the industry as the hot cycle which eliminates the need for a tail rotor and complicated reduction gearing.

Another set of engines, known in the industry as high by-pass turbofans, are employed for the cruise portion of the flight, while the augmented turbo fans are taken off line.

The inventive aircraft has a retractable rotor. Should the rotor system fail to descend into the fuselage when a retraction command is given, the rotor will simply windmill. Should the rotor system fail to pump up for a landing, then the landing can be accomplished via conventional fixed wing and rear thrust options. These options make the VTOL of this invention extremely safe and reliable. The duality of lift and propulsion, plus the available emergency downthrust, provides a safety net for a mechanical or structural failure, or when operating in areas of critical icing and "downbursts."

Another advantage of the invention is its seating design. Airliners such as the 737, 757, etc., called narrow bodies, can arrange first class or business class seating only at four abreast. The 737-300 series has a fuselage transverse section of 139 inches. In comparison, the present invention can achieve first class seating with six abreast, by adding 32 inches on the breadth of the fuselage, for a total of 171 inches. This allows the carrier to offer 96 high priced seats to business travelers. The simple design change also offers a three and four offset aisle arrangement comprising 150 coach class seats, plus a twin aisle layout for six abreast seating. An additional advantage of this aircraft is its ability to operate in a fully competitive regime as a fixed wing, conventional jet without employing the rotor mast. This design element should increase the vehicle's service flexibility.

DISCUSSION OF RELATED ART

Typically, in a vertical lift vehicle such as a helicopter, forward speed is limited due to the onset of compressibility in the retreating region of the blade path. Realizing this constraint, designers have attempted to combine the strongest flight mechanics of the helicopter and the fixed wing aircraft.

One such design is that of the tilt rotor, whereby the engines are faced upward for take-off and then tilt downward for conventional cruise flight. However, current turboprop engines employed by the tilt rotor do not have sufficient horsepower to lift a vehicle large enough to carry a sufficient payload for commercial and humanitarian purposes.

Another scheme for combining the qualities of the helicopter and the conventional aircraft is disclosed in U.S. Pat. No. 3,986,686. This vehicle features a four-bladed rotor in the "X" configuration which houses two blades against the airframe, while the two other airfoils form a fixed wing. This design, however, stops the rotary wing in flight, in order to convert this airfoil into a fixed wing. This is clearly unacceptable for high load, cargo and passenger operations. Computational fluid dynamic models have indicated that during the transition from rotary wing to fixed wing flight, oscillations, vibrations and instability problems arise. Additionally, the geometry, wing loading, high lift devices of a fixed wing are inconsistent with the attributes of a rotary wing. The compromise between the two airfoils, even if the transitional problems could be solved, would result in a high drag vehicle with L/D (lift over drag) ratios around ten or less. A modern airliner operates with L/D values of about 15, which is both fuel efficient and aerodynamically sound.

SUMMARY OF THE INVENTION

In accordance with the present invention, there is provided a commercial vertical take-off and landing (VTOL) vehicle. The VTOL aircraft is a turbofan powered, compound autogyro that employs retractable, rigid rotor blades. The VTOL vehicle comprises a rotor mast that retracts into the fuselage of the aircraft. The retraction device includes a cylindrical mast that moves up and down, and an outer cylinder propelled by a series of hydraulic actuators, or scissor lifts, affixed to a bottom section of the fuselage. The upper portion of the mast is free moving in both the horizontal and vertical planes. Located in the upper mast are twin gas lines leading to a hub section of the rotor. In the hub, the gas lines divide the mass flow into two additional gas lines reaching to the tip ends of the rigid rotor blades.

A revolving, upper section of the rotor mast is attached to a lower, non-rotating section by a spherical bearing. Directly beneath this attach bearing is a distribution plenum, which receives the mass flow from each of two augmented turbofan engines. To achieve high levels of safety not known to present VTOL aircraft, the turbofans are equipped with vectoring vanes that direct the mass flow to the plenum or, in the alternative, out a jet pipe for conventional flight propulsion. Another set of vectoring vanes can direct the mass flow downward, to stabilize the inventive VTOL vehicle in case of a serious problem upon take-off, when close to the ground. In this emergency condition, all available turbofans supply mass flow to the plenum, which allows for continuous take-off climb, or a return to a controlled landing via the downward deflection of the vectoring vanes.

Cascade jets are positioned at the tip end of the rotor blades to supply additional velocity levels to the mass flow. Also, at the tip end section of the rotor blades are hydraulically operated, pop-up vanes that center the rotor wing fore and aft in the slip stream. Once positioned, the rotor is then retracted to form the upper skin of the fuselage.

These features provide both redundant and fail-safe characteristics for the inventive VTOL aircraft which are not provided on similar air vehicles. The variable geometry and vectored thrust allow vertical take-offs and landings while permitting cruise speeds of Mach 0.82. The VTOL aircraft can lift a payload of about 34,000 pounds, which is equivalent to carrying around 145 passengers. The inventive VTOL has a sustained lift that is divided into two independent systems:

1. For take-offs, the VTOL vehicle employs a multi-bladed rotary airfoil, propelled by two augmented turbofans via a reactive drive system known as a hot cycle. Lift is transferred to a fixed wing after the aircraft has established a positive climb rate. During this flight phase, the rotary wing is positioned fore and aft via a pop-up vane, which centers the airfoil in the slipstream. The variable geometry "V" tail is then revolved from a downward position where it does not conflict with the rotor path to an upward position for cruise flight.

2. Once aligned, the rotary wing is retracted into a well, so that the airfoil forms, and becomes the top section of the fuselage, as aforementioned. For redundancy, each of the four turbofans of the VTOL employs three modes of operation:

a. For take-offs and landings, all exhaust gases are directed into the distribution plenum at the base of the retractable rotor mast, then upward to the rotor tips.

b. Each engine can direct the exhaust gases rearward for forward cruise flight.

c. In a low altitude emergency, the thrust from the four engines may be directed downward, via vectoring vanes, to cushion a hard landing.

It is an object of this invention to provide a commercial VTOL aircraft.

It is another object of the invention to provide an improved VTOL aircraft that has built-in system redundancy for safety purposes.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the VTOL of this invention features a compound autogyro which has a unique system of rotor blade retraction and vectored thrust. The VTOL vehicle has redundant thrust systems to provide for emergency conditions. Located in the upper mast are twin gas lines leading to a hub section of the rotor. In the hub, they divide the mass flow into two additional gas lines reaching to the tip ends of rigid rotor blades. A revolving, upper section of the rotor mast is attached to a lower, non-rotating section by a spherical bearing. Directly beneath this attach bearing is a distribution plenum, which receives the mass flow from each of four turbofan engines. To achieve high levels of propulsion flexibility, the turbofans are equipped with vectoring vanes that direct the mass flow to the plenum or, in the alternative, out a jet pipe for conventional flight. Another set of vectoring vanes can direct the mass flow downward to stabilize the VTOL aircraft in case of a mechanical or structural failure upon take-off within close ground effect. The four turbofans supply the mass flow to the plenum, which allows for continuous take-off climb and return to a controlled landing in the event of a failure in one of the turbofans. Cascade jets are positioned at the tip end of the rotor blades to supply additional velocity levels to the mass flow. Also at the tip end section of the rotor blades are hydraulically operated pop-up vanes that center the rotor blade wing fore and aft in the slip stream. Once positioned, the rotor blade is then retracted to form the upper skin of the fuselage, along its longitudinal axis. The "V" tail is a variable geometry surface which is revolved to an upward position for cruise flight.

Figure 1:
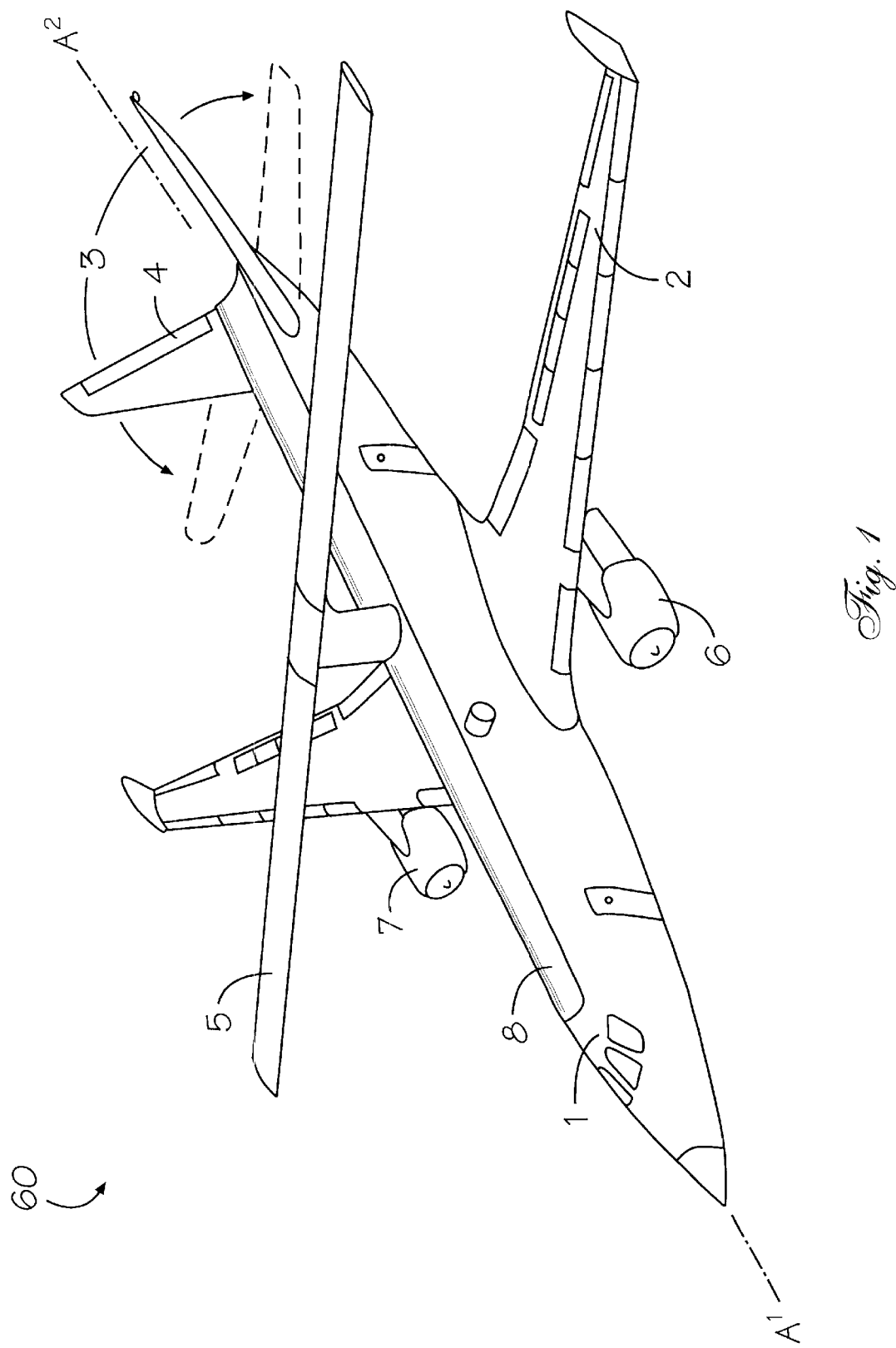
FIG. 1 illustrates a perspective, schematic view of the VTOL vehicle in accordance with this invention.

Now referring to FIG. 1, the VTOL 60 of this invention is illustrated in schematic perspective view. The fuselage 1 supports a conventional, swept-back wing with high-lift and control surfaces.

Figure 7:
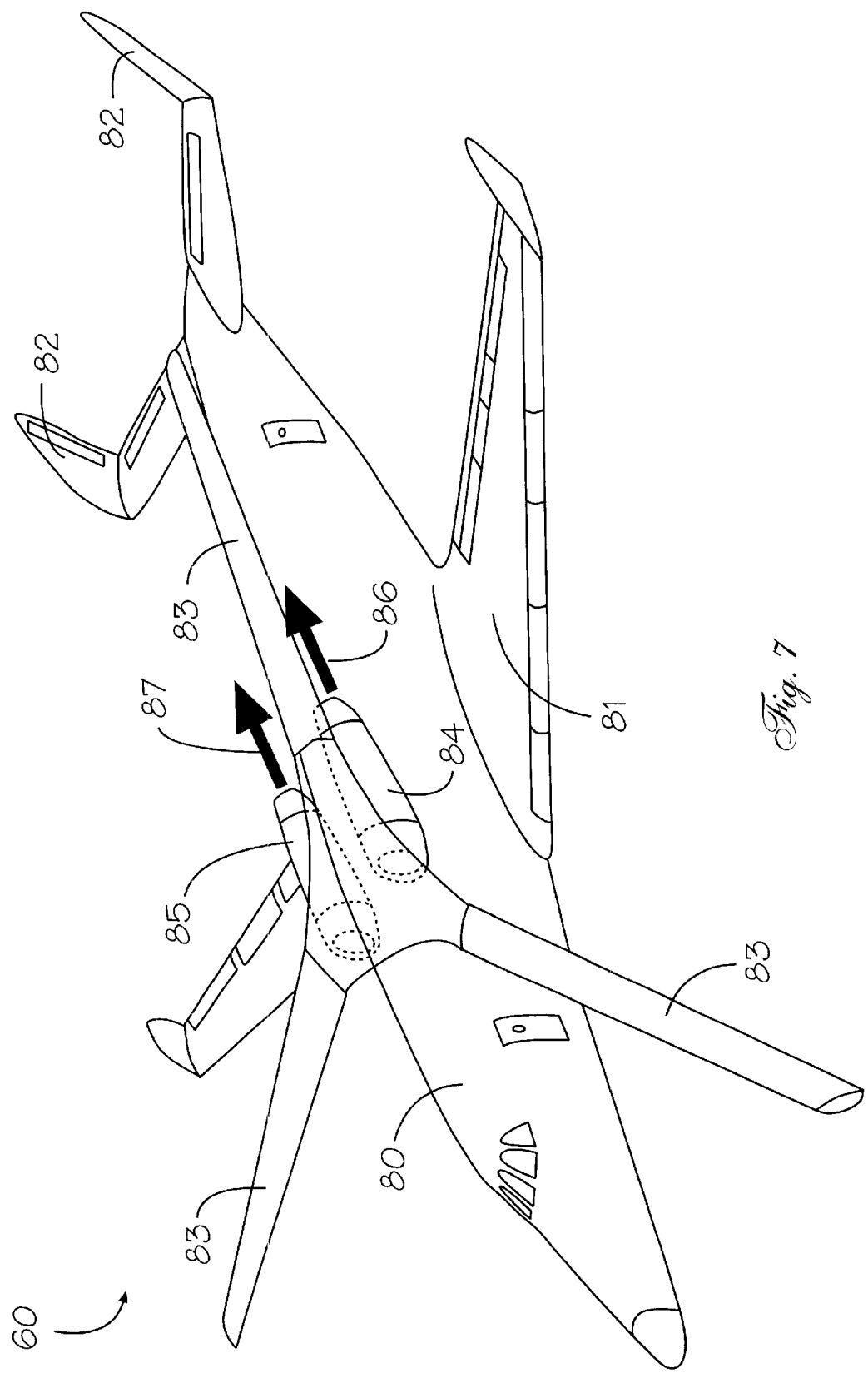
FIG. 7 depicts a schematic, perspective view of an alternate embodiment for the VTOL aircraft depicted in FIG. 1, which features a non-retracting rotor employed for the cargo version of aircraft shown in FIG. 1.

In another embodiment shown in FIG. 7, the VTOL 60 includes a conventional planform featuring a non-retractable rotor 50 and a tail and rudder section 52 positioned at the rear of the fuselage 54.

In FIG. 1, the preferred layout embodiment of the VTOL vehicle 60 is illustrated. The fuselage 1 supports a fully developed, swept-back wing 2 designed for high lift at low speeds. Another advantage of this wing 2 is to provide the aircraft with the capacity for operating as a conventional jet in the normal traffic mix should the VTOL 60 capability of the aircraft not be necessary or desired. This operating flexibility is an added safety element not generally known to vertical lift aircraft.

The pitching movements associated with the wing 2 are offset by the twin "V" tail 3 which employs ruddervators 4 which combine the attributes of conventional rudders and elevators. This tail 3 is mounted on a hydraulically rotating pivot axis (not shown). For take-offs and landings, when the rotary wing 5 is employed, the "V" tail 3 is swung down to avoid a conflict with the rotary wing 5 blade path.

The VTOL 60 is powered by as many as four turbofan engines. For cruise flight, two fuel efficient, high by-pass turbofans are employed. These turbofans 6 and 7 are underslung from the leading edge of the wing 2. These engines have three operating modes:

1. Conventional rear exhaust.
2. Downthrust, shown in FIG. 6A, via vectoring vanes for emergency operating conditions.
3. Upward via wing 2 gas lines (not shown) to power the rotor blades 5.

Figure 3:
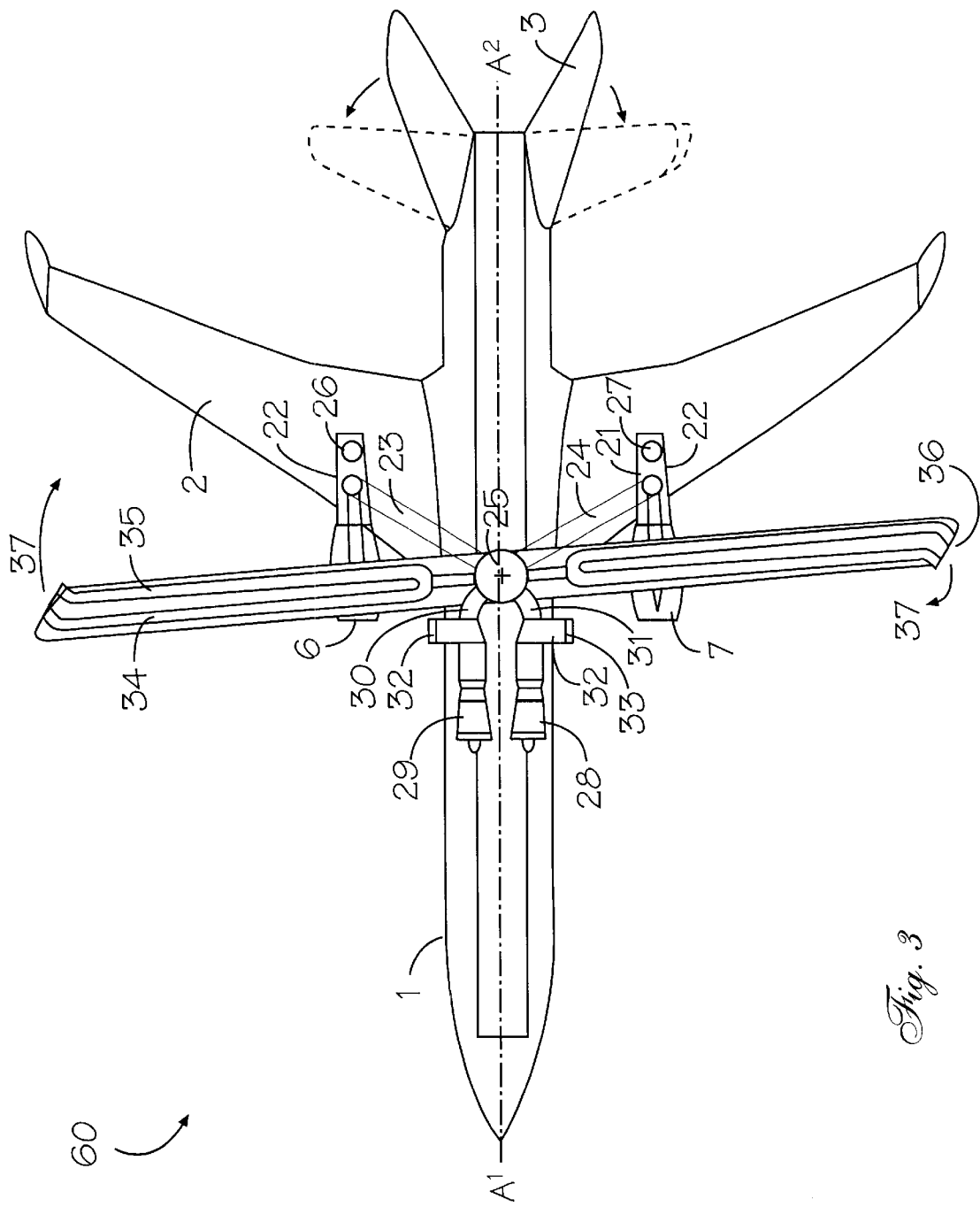
FIG. 3 depicts a schematic plan view of the VTOL shown in FIG. 1, featuring a preferred planform, and the gas lines for moving the mass flow from the turbofans to the center plenum.

Another set of turbofans, shown in FIG. 3, are housed within the upper fuselage 1. These augmented turbofans have two operating modes:

1. Supplying the mass flow to the rotor blades 5.
2. Downthrust for emergency conditions as shown in FIG. 6A.

The rotary wing 5 rises out of the fuselage 1, and is propelled by a mixed flow of gases from all four turbofans, 6 and 7, and the two turbofans, not shown, housed within the fuselage 1. Upon take-off, all exhaust gases are directed to the rotor blade 5. The VTOL 60 may continue a positive vertical climb rate, even in the unlikely condition of a failure of any two turbofans.

Upon obstacle clearance and/or an altitude of about 800 feet, the cruise turbofans 6 and 7 alter their thrust direction from feeding the rotor blades 5 to a conventional rear thrust. This actuation is cockpit controlled via two hydraulically operated vectoring vanes shown in FIG. 5. At this stage of the climbout, the rotor 5 is still powered by the two augmented turbofans shown in FIG. 3. This thrust system is known as the hot cycle and has been successfully demonstrated.

The advantage of flexible vectoring is the ability of the aircraft 60 to gain forward speed immediately using the cruise turbofans 6 and 7. This accelerated climb rate has two advantages over other vertical lift vehicles.

1. Altitude is gained quickly for an emergency autorotative, or partially powered, emergency landing.
2. The sustentation of lift is transferred almost immediately to the fixed wing 2 for a conventional jet climbout.

This unique dual wing and propulsion system helps create a failsafe and redundant fight management system. Other advantages of this dual operating system, besides quicker altitude and velocity gains, are as follows:

1. The strongest design elements of the fixed wing and rotary wing aircraft are incorporated into the VTOL 60 aircraft without compromise.
2. In the extreme case of operations in severe meteorological conditions, the rotary wing 5 can be operated in the unloaded or loaded condition, so that the VTOL becomes stall and spin proof, two major causes of aircraft control loss leading to catastrophic accidents.

Once the VTOL 60 passes through a velocity envelope of about 170 knots, or 196 mph, the rotary wing is unloaded and the augmented turbofans shown in FIG. 3 are taken offline. The rotary wing 5 is then freely windmilling in the slipstream but still providing additional lift. During this portion of the climb, the rotary wing 5 is longitudinally positioned fore and aft along central axis, $A^1$ and $A^2$, of the fuselage 1. This is accomplished via a pop-up directional device similar to a weathervane, as described hereinbelow with reference to FIG. 6. In this position the rotary wing 5 can be retracted into a well 8 running longitudinally along the upper surface of the fuselage 1.

The rotary wing 5 is retracted into the fuselage 1 via a retraction mechanism comprised of either scissor jacks or hydraulic actuator jacks (not shown), well understood in the art.

The upper section of the rotary wing 5 airfoil then forms the topmost surface of the fuselage 1 resulting in a clean, aerodynamically efficient geometry which helps lift over drag ratios.

Figure 2:
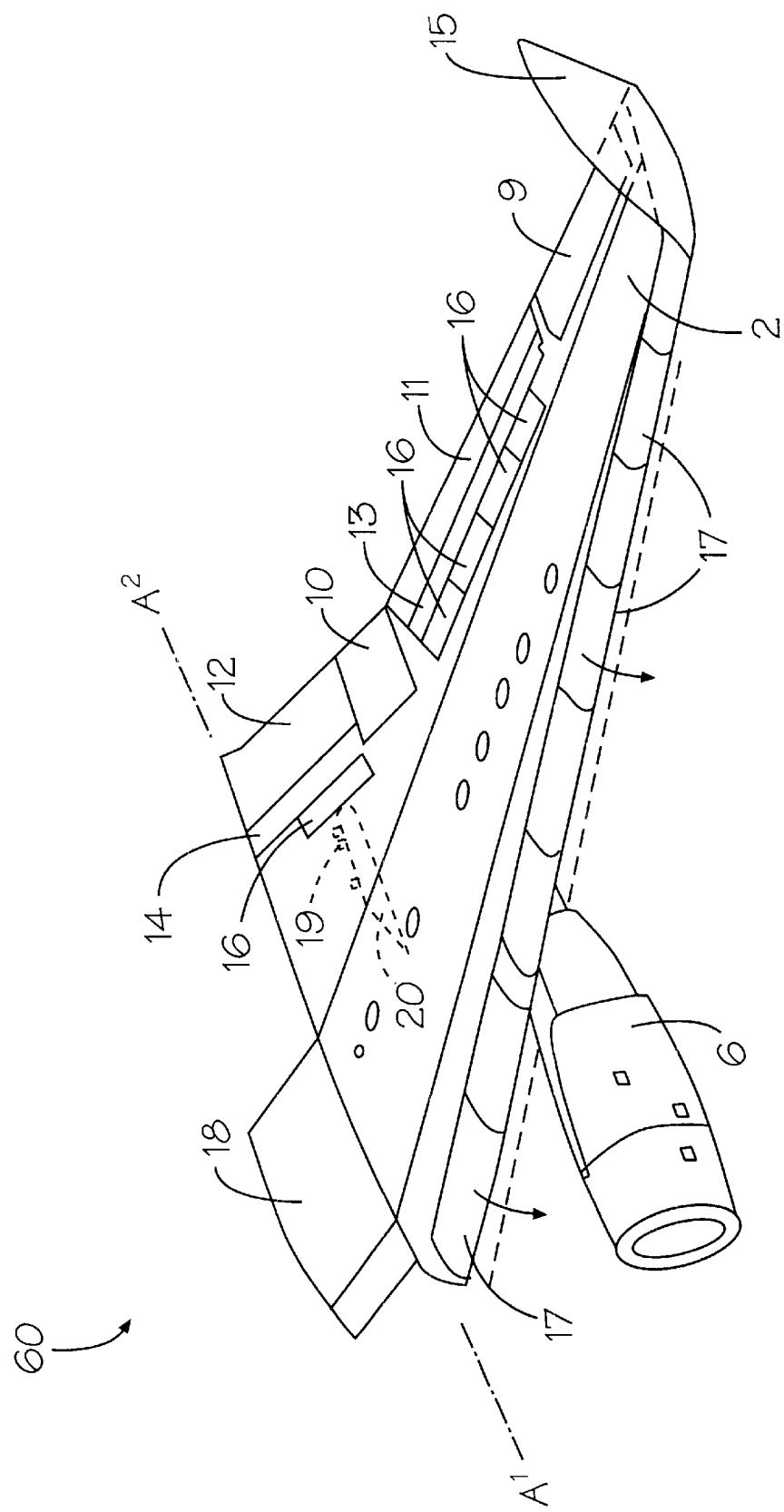
FIG. 2 is a more detailed schematic view of the fully developed wing indicating high lift and control surfaces similar to those employed on a conventional jet.

Referring to FIG. 2, a perspective, more detailed, schematic view of the wing 2. This airfoil is consistent with wings on modern jet transports and other aircraft where the speed envelope varies widely. For take-offs and landings, the high-lift, and drag components, of the wing 2 enhances lift-drag elements for control at low speeds. Upon entering the high speed climb-out and cruise portion of the flight, these high lift devices are retracted into the camber of the wing 2. High lift, drag devices and flight spoilers are well known and proven in the industry, but not common to any other VTOL aircraft.

The wing 2 is composed of twin surfaces which control movements around the roll axis, $A^1$ and $A^2$, of VTOL 60. The outboard aileron 9 is coordinated with the inboard aileron 10. By deflection of these control surfaces, and the accompanying lifting of the surfaces on the opposing wing, the VTOL 60 will bank and consequently turn on its roll axis, $A^1$ and $A^2$. For landings and take-offs at various settings, the wing 2 employs two systems of flaps, the outboard flap 11, and the inboard flap 12. These flaps operate with fairing vanes 13 and 14 to enhance the airflow over the trailing edge of the wing 2.

In order to limit induced drag, the wing 2 is fitted with a winglet 15. To reduce lift in the air and on the ground after landing, the wing 2 is equipped with spoilers 16 which disrupt the continuity of the airflow over the upper camber of the wing 2 and thus reduce lift causing the VTOL 60 to lose altitude. On the ground, the spoilers 16 are employed after touchdown to spoil lift and solidly plant the weight of the aircraft on the landing gear.

On the leading edge of the wing 2 is a series of slats 17 which are employed in low speed conditions to improve the airflow and delay the onset of a stall. These high lift devices are well known in the industry.

The wing 2 also features a carry-through spar or center wing 18 which joins both the left hand and right hand outer wing 2 adding continuity strength to the structure. The main landing gear, not shown, is attached to the wing 2 by a fitting 19 and supported by an exterior plate doubler 20.

The high by-pass cruise turbofan 6 is attached to the wing 2. The exhaust gases from this turbofan 6 are transferred through a gas line to the rotor blade 5 (not shown) but illustrated in FIG. 3.

Referring again to FIG. 3, a plan view of the VTOL 60, the preferred embodiment, the wing 2 is illustrated along with the "V" tail 3. The high by-pass turbofans 6 and 7 are designed with an extended jet pipe 21. Via vectoring vanes 22, the exhaust gases are directed via lines 23 and 24 embedded in the wing 2 to the distribution plenum 25 at the lower section of the rotary wing 5 mast, shown in FIG. 5.

At the far end of the jet pipe 21 is another set of vectoring vanes 26 and 27 to direct the exhaust gases downward in an emergency operation to assist the VTOL 60 in making a soft landing as illustrated in FIG. 6A.

Two augmented turbofan engines 28 and 29 are housed within the fuselage 1. The exhaust gases from these engines are fed, via gas lines 30 and 31 directly into the distribution plenum 25. For emergency operating conditions, the mass flow from the augmented turbofans 28 and 29 are directed downward via another set of vectoring vanes 32 and then outward to revolving nozzle 33, also illustrated in FIG. 6A.

From the distribution plenum 25, the mass flow from all turbofans is directed upward through the rotor mast, not shown, and via gas lines 34 and 35 to the rotor tip 36. There, the mass flow enters a cascade jet, not shown. This accelerated motive power turns the rotary wing 5 as shown by arrows 37.

Figure 4:
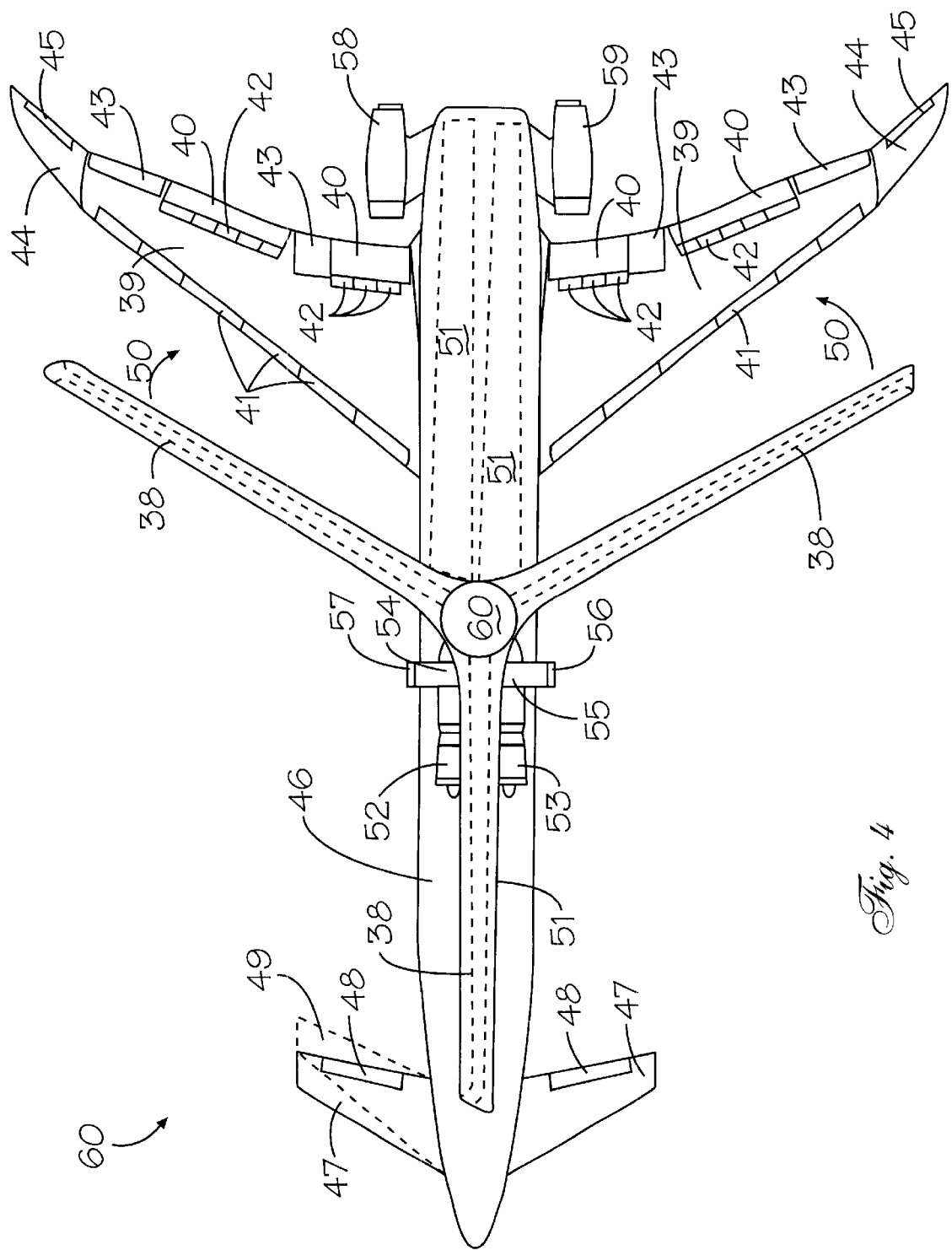
FIG. 4 shows a schematic plan view of an alternate embodiment of FIG. 3, illustrating a three-bladed rotary airfoil and a rear mounted wing and a foreplane known as a canard.

Referring to FIG. 4, a plan view of an alternate embodiment of the VTOL 60 of FIGS. 1, 2 and 3 is illustrated. In this embodiment, three rotary blade wings 38 are depicted. The planform is arranged as a canard layout. The main lifting surface is comprised of a fully developed wing 39 with high lift and drag devices including flaps 40, leading edge slats 41 and spoilers 42. Additionally, the wing 39 employs elerons 43 which when positioned in concert provide elevator control and when moved in opposite directions, control the bank of the VTOL 60.

Additionally, the wing 39 employs twin vertical stabilizers 44 plus conventional rudders 45.

Positioned at the forward end of the fuselage 46 are fore-planes 47, known as canards, plus fore-elevators 48 to assist in pitch management and longitudinal stability. Also, the fore-planes may retract for a more favorable aerodynamic profile as indicated by the phantom lines 49.

In this alternate embodiment, the vertical lift is achieved by three rotor blades 38 which, upon being halted after take-off, swing inward as shown by the arrows 50, and once positioned, all three blades are retracted into a well 51.

Augmented turbofans 52 and 53 supply exhaust gas to the rotor blades via the hot cycle. In an emergency operation these gases are thrust outward through vectoring vanes 54 and 55 and then downward through a nozzle 56 and 57, also illustrated in FIG. 6A.

In this embodiment, the high by-pass cruise engines 58 and 59 are mounted outboard of the rear section of the fuselage 46. Internal gas lines, not shown, from these engines will supply exhaust gases to the rotary wings 38 via the distribution plenum 60.

Figure 5:
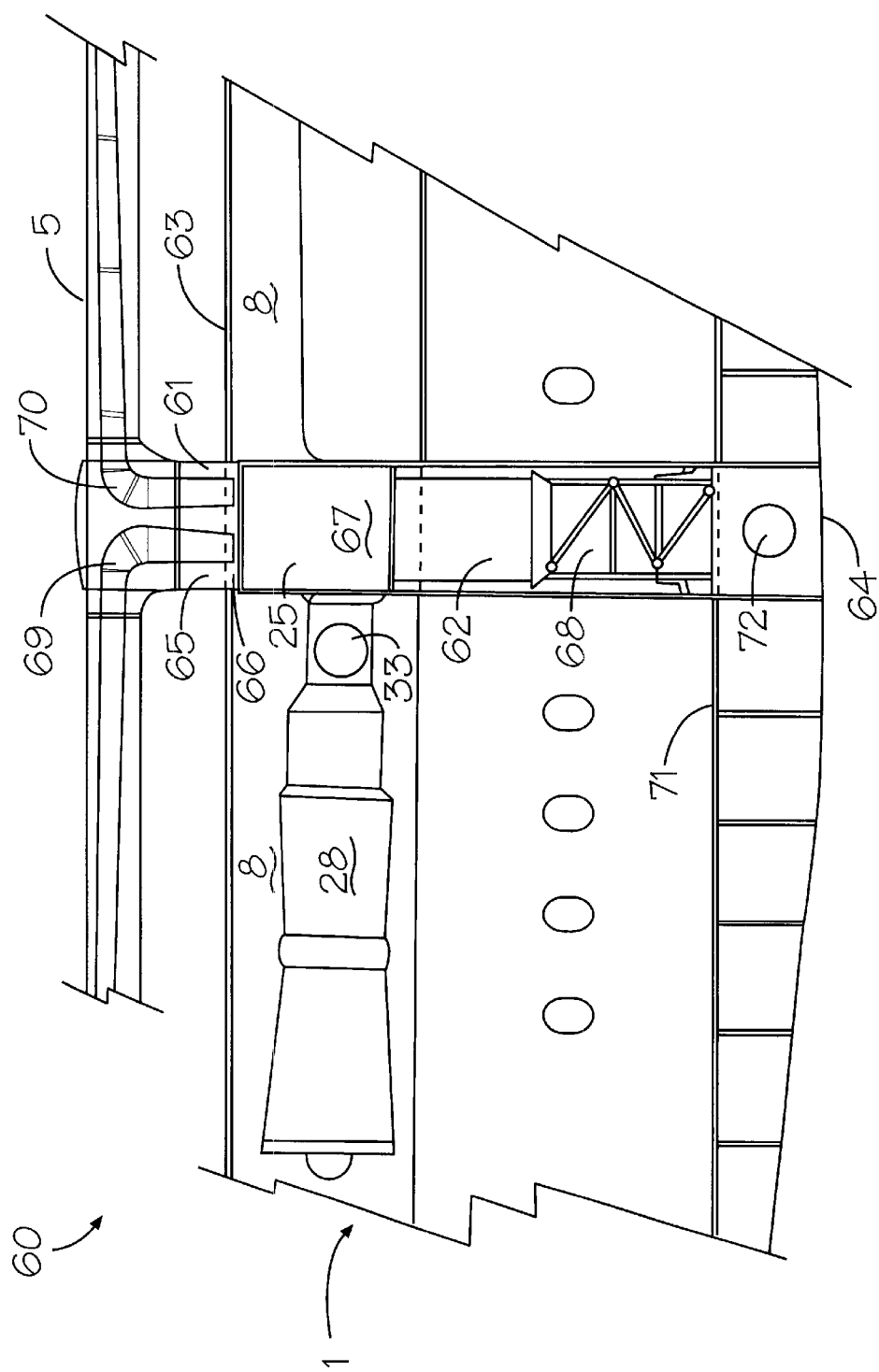
FIG. 5 illustrates a partial side view of the rotor mast retraction mechanism of the VTOL vehicle shown-in FIG. 1.

Referring to FIG. 5, the side profile of a portion of the VTOL 60 is illustrated, showing the retraction rotor mast 61. A cylindrical structure 62 is located in the center of the fuselage 1 which extends from the top 63 to the bottom 64 of the fuselage 1. The carry down cylinder structure 62 provides torsional stiffness and dynamic support. This structure 62 is divided into two sections. The upper section 65 rotates, and is seated on a rigid spherical bearing 66. The lower section 67 is non-rotative. All sections move vertically within a tubular, or telescoping assembly 62.

The telescoping apparatus for moving the telescoping mast 61 up or down is hydraulically operated by scissor jacks 68. An alternate embodiment (not shown) may comprise hydraulic actuators well known in the art.

The retraction well 8 forms the upper side section of the fuselage 1. The side-by-side augmented turbofans 28 and 29 (not shown) are located outboard and below the retraction well 8. These engines supply exhaust gases to the distribution plenum 25 as shown in FIG. 3. The mass flow from the augmented turbofans 28 and 29 rise upward into the revolving section 65 of the rotor mast 61. From there the mass flow travels, via twin gas lines 69 and 70 to the end of the rotor 5 (not shown).

Exhaust gases from the high by-pass turbofans 6 and 7, shown in FIG. 1 enter the cylinder structure 62 beneath the main deck 71 through a port 72 and travel upward through the structure 62 where they combine with the mass flow from the two augmented turbofans 28 and 29. The emergency descent port 33 directs the exhaust gases downward from the augmented turbofans 28 and 29.

Figure 6:
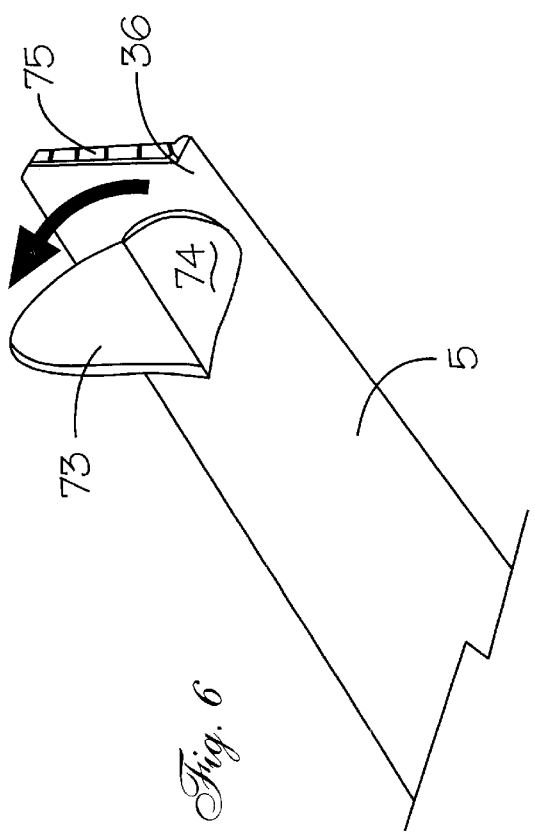
FIG. 6 illustrates a perspective view of the rotor tip and the pop-up centering vane for the VTOL aircraft shown in FIG. 1.
Figure 6A:
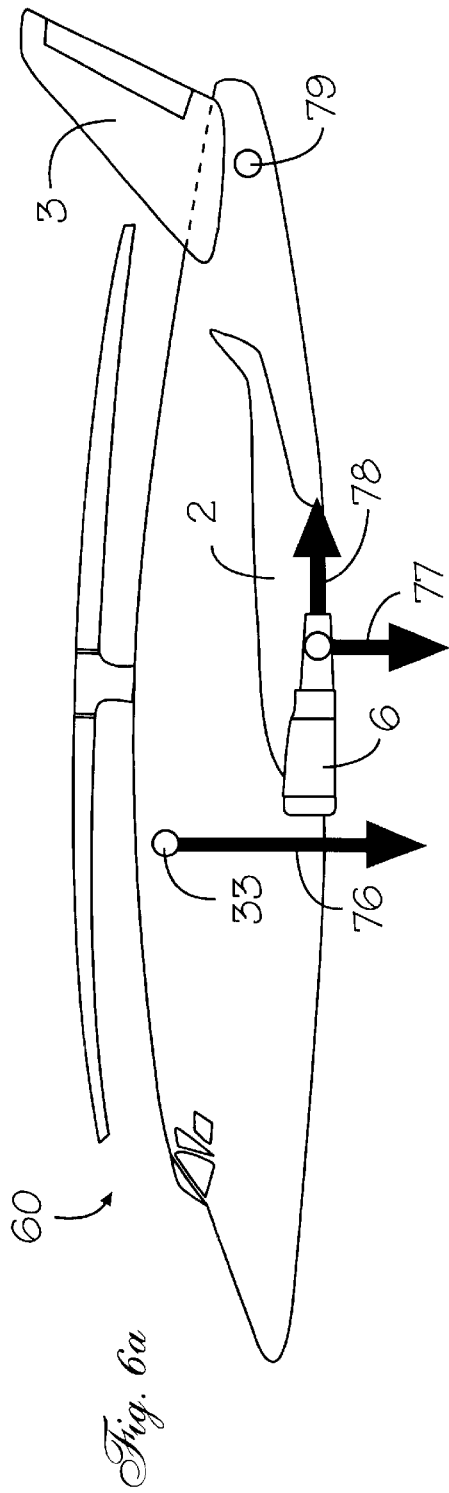
FIG. 6A shows a side view of the fuselage illustrating the emergency downthrust regime.

Referring to FIG. 6, a partial perspective view of the rotor blade 5 and the tip end 36 is shown. A typical hydraulic apparatus (not shown) operates a pop-up centering vane 73 that directs the rotor blade 5. With the centering vane extended the rotor will line-up fore and aft along the longitudinal center axis, $X^1$ and $X^2$, of the fuselage 1 as shown in FIG. 1. As aforementioned, once the blades 5 are centered and locked, they are retracted into the fuselage 1 retraction well 8. Cavities 74 (only one shown here) support the pop-up vane(s) 73, which retract therein to become flush with the upper camber of their respective blades. The cascade jets 75 accelerate the mass flow from the respective turbofans 7, 8, 28 and 29, of the preferred embodiment.

Referring to FIG. 6A, a profile view of the VTOL 60 showing the path of the downward thrust for emergency operation within close ground effect is shown. Through a revolving nozzle 33 the exhaust gases from the augmented turbofans 28 and 29 (not shown) are directed downward for a soft, controlled landing as indicated by the arrow 76. Additionally, the exhaust gases from the high by-pass turbofans 6 and 7 (not shown) are directed downward, as illustrated by the arrow 77. Arrow 78 indicates the usual exhaust route of the high by-pass turbofan 6 without the deployment of the downward vectoring.

Also illustrated in 6A is the yaw nozzle 79 which provides directional control of the VTOL 60 until aerodynamic lift and control is established by the airflow over the wing 2 and the "V" tail 3 during the first stage of the take-off climbout.

Referring to FIG. 7, an alternate embodiment designed for humanitarian airlift cargoes, the VTOL 60 is shown in a perspective, schematic view. The fuselage 80 supports a wing 81 with high lift devices as illustrated in FIG. 2. The wing 81 may also be located rearward as shown in FIG. 3. A conventional twin tail 82 is located on the after end of the fuselage 80.

In this alternate embodiment, the rotor 83, comprising two or three blades, is not retracted in order to provide higher cubic loading values within the fuselage 80. The rotor 83 is powered by three or four turbofan engines via the hot cycle. One or two of these engines (not shown) are housed within the fuselage 80. The others 84 and 85 are mounted outboard on the fuselage.

During climbout, when lift is transferred to the fixed wing 81, the exhaust gases from the turbofans 84 and 85 are directed from the rotor 83 to the normal rear exhaust as indicated by the arrows 86 and 87. The rotor 83 is then halted, forming a fixed wing.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims:

1. A compound autogyro having built in redundancy for safety purposes, comprising:
   a fuselage devoid of any tail rotors having an upper surface for supporting at least one rotor blade;
   a number of fixed wings supported by said fuselage, said fixed wings having control surfaces and high lift means;
   at least one rotor blade rotatively supported upon said upper surface of said fuselage; and
   a plurality of jet propulsion engines supported by said fuselage for generating thrust to achieve flight and lift, and operatively connected to said at least one rotor blade for rotatively moving said at least one rotor blade, whereby redundancy is built in to the compound autogyro for safety.

2. The compound autogyro in accordance with claim 1, wherein said number of fixed wings comprises at least one of the group of fixed wing elements consisting of: flaps, slats, a horizontal stabilizer, at least one vertical stabilizer, rudder, and combinations thereof.

3. The compound autogyro in accordance with claim 1, wherein said number of fixed wings comprises at least one of the group of fixed wing elements consisting of: a canard, a mid-wing section, a tail-section, and combinations thereof.

4. The compound autogyro in accordance with claim 1, further comprising retraction means supported by said fuselage for retracting said at least one rotor blade into said fuselage adjacent said upper surface.

5. The compound autogyro in accordance with claim 4, wherein said at least one rotor blade is retracted into said fuselage substantially flush with said upper surface.

6. The compound autogyro in accordance with claim 1, wherein said at least one rotor blade is operatively independent of said number of fixed wings.

7. The compound autogyro in accordance with claim 1, wherein said at least one rotor blade comprises at least three rotor blades rotatively supported by said fuselage.

8. The compound autogyro in accordance with claim 4, wherein said retraction means comprises means defining a well disposed in said fuselage for housing said retracted at least one rotor blade therein.

9. The compound autogyro in accordance with claim 8, wherein said retraction means comprises folding means for folding said at least one rotor blade into said well.

10. The compound autogyro in accordance with claim 1, further comprising thrust means supported by said fuselage for directing a vectored thrust from said compound autogyro.

11. The compound autogyro in accordance with claim 10, wherein said thrust means comprises force-directed vanes.

12. The compound autogyro in accordance with claim 1, wherein said at least one rotor blade comprises tip ends, and further comprising a plenum for directing mass flow to said tip ends of said at least one rotor blade.

13. The compound autogyro in accordance with claim 1, further comprising a pop-up centering vane disposed on said at least one rotor blade.

14. A compound autogyro having built in redundancy for safety purposes, comprising:
   a fuselage devoid of any tail rotors having an upper surface for rotatively supporting at least one rotor blade;
   a number of fixed wings supported by said fuselage, said fixed wings having control surfaces and high lift means;
   at least one rotatively fixed rotor blade that is rotatively supported upon said upper surface of said fuselage; and
   a plurality of jet propulsion engines supported by said fuselage for generating thrust to achieve flight and lift, and operatively connected to said at least one rotor blade for rotatively moving said at least one rotor blade, whereby redundancy is built in to the compound autogyro for safety.

15. The compound autogyro in accordance with claim 14, wherein said number of fixed wings comprises at least one of the group of fixed wing elements consisting of: flaps, slats, a horizontal stabilizer, at least one vertical stabilizer, rudder, and combinations thereof.

16. The compound autogyro in accordance with claim 14, wherein said number of fixed wings comprises at least one of the group of fixed wing elements consisting of: a canard, a mid-wing section, a tail-section, and combinations thereof.

17. The compound autogyro in accordance with claim 14, wherein said at least one rotor blade is operatively independent of said number of fixed wings.

18. The compound autogyro in accordance with claim 14, wherein said at least one rotor blade comprises at least three rotor blades rotatively supported by said fuselage.

19. The compound autogyro in accordance with claim 14, further comprising thrust means supported by said fuselage for directing a vectored thrust from said compound autogyro.

20. The compound autogyro in accordance with claim 19, wherein said thrust means comprises force-directed vanes.

21. The compound autogyro in accordance with claim 14, wherein said at least one rotor blade comprises tip ends, and further comprising a plenum for directing mass flow to said tip ends of said at least one rotor blade.

22. The compound autogyro in accordance with claim 14, further comprising a pop-up centering vane disposed on said at least one rotor blade.

23. The compound autogyro in accordance with claim 14, further comprising at least one air inlet.

24. The compound autogyro in accordance with claim 23, wherein said at least one air inlet comprises a lift inlet and a cruising inlet.

25. A compound autogyro having built in redundancy for safety purposes, comprising:
- a fuselage devoid of any tail rotors having an upper surface for rotatively supporting at least one rotor blade;
- a number of fixed wings supported by said fuselage, said fixed wings having control surfaces and high lift means;
- at least one rotor blade rotatively supported upon said upper surface of said fuselage;
- a plurality of jet propulsion engines supported by said fuselage for generating thrust to achieve flight and lift, and operatively connected to said at least one rotor blade for rotatively moving said at least one rotor blade, whereby redundancy is built in to the compound autogyro for safety; and
- thrust means supported by said fuselage and operatively connected to said plurality of jet propulsion engines for directing a vectored thrust from said compound autogyro.

26. The compound autogyro in accordance with claim 25, wherein said number of fixed wings comprises at least one of the group of fixed wing elements consisting of: flaps, slats, a horizontal stabilizer, at least one vertical stabilizer, rudder, and combinations thereof.

27. The compound autogyro in accordance with claim 25, wherein said number of fixed wings comprises at least one of the group of fixed wing elements consisting of: a canard, a mid-wing section, a tail-section, and combinations thereof.

28. The compound autogyro in accordance with claim 25, further comprising retraction means supported by said fuselage for retracting said at least one rotor blade into said fuselage adjacent said upper surface.

29. The compound autogyro in accordance with claim 28, wherein said at least one rotor blade is retracted into said fuselage substantially flush with said upper surface.

30. The compound autogyro in accordance with claim 25, wherein said at least one rotor blade is operatively independent of said number of fixed wings.

31. The compound autogyro in accordance with claim 25, wherein said at least one rotor blade comprises at least three rotor blades rotatively supported by said fuselage.

32. The compound autogyro in accordance with claim 28, wherein said retraction means comprises means defining a well disposed in said fuselage for housing said retracted at least one rotor blade therein.

33. The compound autogyro in accordance with claim 32, wherein said retraction means comprises folding means for folding said at least one rotor blade into said well.

34. The compound autogyro in accordance with claim 25, wherein said thrust means comprises force-directed vanes.

35. The compound autogyro in accordance with claim 25, wherein said at least one rotor blade comprises tip ends, and further comprising a plenum for directing mass flow to said tip ends of said at least one rotor blade.

36. The compound autogyro in accordance with claim 25, further comprising a pop-up centering vane disposed on said at least one rotor blade.

\* \* \* \* \*